H. J. SHAW
CONCRETE MIXTURE
July 5, 1932. Re. 18,511
Original Filed Aug 26, 1925 2 Sheets-Sheet 1
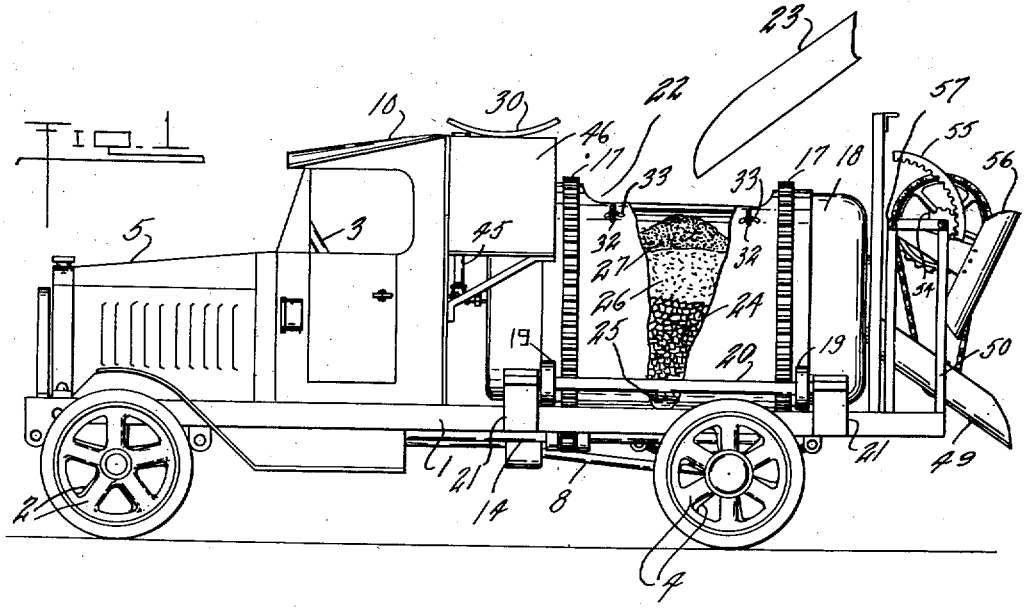
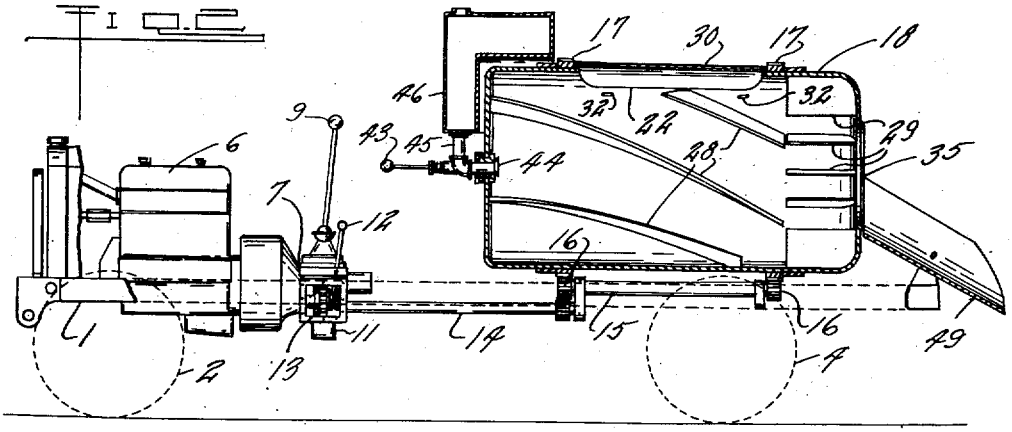
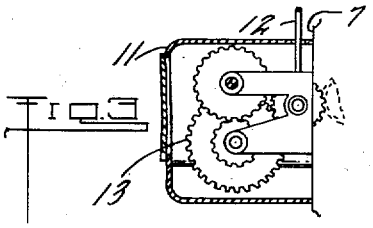
Harry J. Shaw
INVENTOR
BY
Geo. E. Kirk
ATTORNEY H. J. SHAW
CONCRETE MIXTURE
July 5, 1932.
Re. 18,511
Original Filed Aug. 26, 1925 2 Sheets-Sheet 2
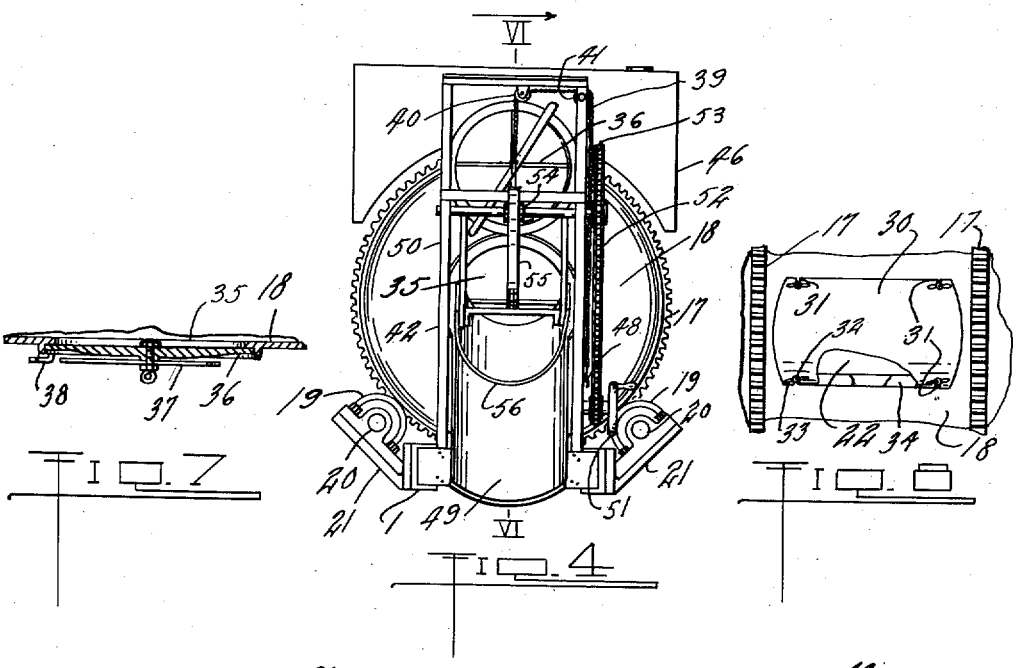
FIG. 7
FIG. 4
FIG. 6
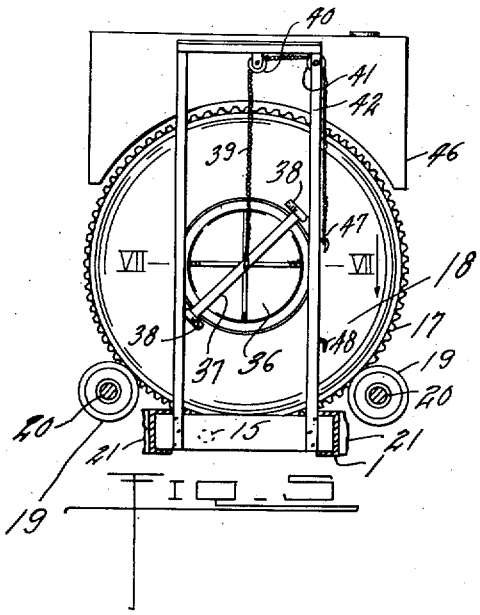
FIG. 5
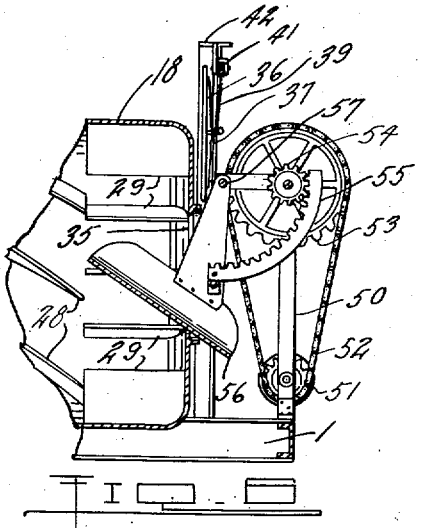
FIG. 8
Harry J. Shaw
INVENTOR
BY Geo. E. Kirk
ATTORNEY Reissued July 5, 1932

Re. 18,511

UNITED STATES PATENT OFFICE

HARRY J. SHAW, OF TOLEDO, OHIO

CONCRETE MIXTURE

Original No. 1,615,315, dated January 25, 1927, Serial No. 52,528, filed August 26, 1925. Application for reissue filed January 21, 1929. Serial No. 334,042.

This invention relates to transporting material to be agitated.

This invention has utility when incorporated in a motor truck and rotatable container mounted thereon to be carried and controllably rotated.

Referring to the drawings:

Fig. 1 is a side elevation, with parts broken away, showing an embodiment of the invention in a motor truck with a rotatable cylindrical type of concrete mixer;

Fig. 2 is a view similar to Fig. 1, with parts broken away, showing more clearly the details of control and operation;

Fig. 3 is a detail view of transmission connection from the transmission case for the concrete mixer;

Fig. 4 is a rear elevation of the concrete mixer of Fig. 1, with the parts in dumping relation;

Fig. 5 is a rear view of the mixer in closed position;

Fig. 6 is a partial section of the mixer on the line VI—VI, Fig. 4, showing the parts in dumping position;

Fig. 7 is a partial section on the line VII—VII, Fig. 5, showing the closure for the rear discharge opening; and Fig. 8 is a view of the lateral closure for the concrete mixer.

Chassis or body 1 is shown as having forward pair of wheels 2, as wheels directed or steered by steering wheel 3. This chassis 1 is also sustained by a second or rear pair of wheels 4 as the traction propulsion or driving wheels for the vehicle. Carried above the forward pair of wheels 2 and under hood 5 is motor 6 effective through transmission 7 for operating propeller shaft 8 in driving the pair of rear wheels 4 in propelling the vehicle. Lever 9 in cab 10 serves to determine the speeds desired in vehicle propulsion.

The transmission 7 has auxiliary housing 11 therefrom into which extends clutch lever 12 from the cab 10 effective for controlling transmission through speed reduction gear train 13 in the housing 11 for actuating rearwardly extending shaft 14 driving shaft 15 having pinions 16 in mesh with toothed bands 17 of cylindrical vessel or container 18 mounted by rollers 19 on shaft 20 sustained by brackets 21 on the chassis or body 1 in position centrally above the rear pair of wheels 4 of this motor truck. This vessel 18 has lateral opening 22 into which chute 23 may deliver coarse material 24 is heaping relation above water lever 25. This water lever 25 in the container 18 is primarily to preclude adherence of cement to the interior of this vessel 18 and thus render cleaning and up-keep of the vessel or mixer more readily possible.

Upon this coarse material or broken stone 24 as heaped in the container 18 is dumped void filling fines, as sand 26. Then upon such sand 26 is placed the bulk cement 27. The coarse material is to an extent to hold or sustain the cement away from the water in the container 18. These materials are proportioned according to the desired batch for the concrete mixture. Such may be, for a five-ton truck, two cubic yards of stone; one cubic yard of sand; and one-half cubic yard of cement. This material as loosely dumped or heaped in the concrete mixer vessel 18 bulks for approximately three and one-half cubic yards of loose material and heaps up above the axis of this vessel as rotated controllably from the cab 10.

This vessel 18 has on its inner walls spiral inwardly extending vanes 28 as flanges which may direct into lifting pockets or flanges 29 near the rear end of the vessel 18. The vessel opening 22 is sealed by closure 30 having lateral notches 31 into which swing bolts 32 may be shifted to have wing nuts 33 run up thereon for sealing this closure 30 with the vessel 18. Packing 34 is provided so that such sealing may be sufficiently tight to retain the mixture during the mixing operation as brought about by rotating the cylindrical vessel 18.

This vessel 18 has, rearwardly, axial opening 35 which may be sealed by closure 36 carrying transversely extending arm 37 swingable to have wedge engagement with hooks 38. Centrally of this opening 35 extends flexible connection or chain 39 over guide pulleys 40, 41, mounted in guide frame 42.

In the normal operation hereunder, this disclosure has peculiar value in picking up at the supply yard or warehouse from overhead bins, the ingredients of the several respective materials for the batch. This quantity may be hauled directly to the job, as for a paving operation or building construction. It is to be noted in the rotation operations hereunder with the structure closed there is not a change of atmosphere in the container. This is a factor in retaining workability of the cement mixture. The power of the vehicle may be used in such case for transportation. In practice, the interval for mixing the ingredients is a relatively shorter time than the normal interval from a warehouse or yard to the region of the work where the mixture is to be delivered. Accordingly, it is not regularly contemplated to operate the concrete mixer while the truck is in transit. However, with an adequate power plant in the truck or reduced road resistance, such may be done. As the vehicle reaches or approximates the region for use of the mixture, the operator of the vehicle in the cab 10 at the operator's station may pull handle 43 thus opening valve 44 to allow discharge of water by pipe 45 from tank 46 carried by the cab 10 and partially over the forward end of the concrete mixer 18. With this supply of water up to the quantity desired for the batch to supplement the original wash water residue in the vessel 18, the operator may, through handle 12, effect the rotation of the batch of ingredients and water in the mixer 18. In practice, this may run for one or two minutes or the desired time interval.

As the mixing operation is completed, which operation may be at a slow rate of rotation, say 18 R. P. M., a workman may knock the lever 37 clear of the wedge hooks 38. The material in the vessel 18 being normally of a height to strike against this closure 36 and being so directed in the operation of the vessel 18 by the flanges 28, 29, this closure 30, as released, at once springs outward into the guide way 42 so that the workman may, through handle 47, operate the chain 39 to bring the handle 47 to hook 48, thus lifting the closure 36 clear of the opening 35, allowing the material to flow by chute 49 for discharge upon the work, or in the desired position as in a conveyor.

For fully emptying the concrete mixer 18, a supplemental device is disclosed which is normally clear of the mixer during the mixing operation. This device comprises frame 50 having crank wheel 51 connected by sprocket chain 52 with sprocket wheel 53 carrying pinion 54 in mesh with segment 55 rigid with auxiliary chute 56 mounted in bearing 57 coaxial with the segment 55. The operation of the crank wheel 51 brings about a shifting of this auxiliary chute 56 from inactive position as shown in Fig. 1 to operative discharge position as shown in Fig. 6 so that the residue of the batch of the concrete as lifted by the flanges 28, 29, may fall upon this chute 56 and thence be conducted to the chute 49 in completing the emptying of the mixer 18. As the mixer is emptied the wash water may be supplied thereto for discharge by way of this auxiliary chute 56 to the chute 49. Thereafter the closure 36 is placed in position and the wash water residue left in the reservoir or vessel 18 or this slight quantity of water introduced into the vessel 18. The vessel is then stopped with the opening 22 upward and the truck is driven back to the source of material supply. The closure 30 is removed by turning back the wing nuts 33 and swinging these bolts out of the slots 31. As this closure 30 is removed, the batch proportions may be received in the vessel 18, while the tank 46 is given another supply of water. This cycle of operations may be expeditiously completed with the result that a single manual handling or mechanical handling of the ingredients for the concrete mixture occurs, and at once the material starts from the warehouse or supply source, it goes directly into the work and there is no loss by improper proportions and there is additional economy in minimizing the labor expense, as well as speed in effecting the work.

It is to be noted as a factor of material value in this disclosure, that the truck is capable, under its motor, of normal truck travel rate notwithstanding this structure includes therewith a concrete mixer. This means that in transporting the material to the location, such may be accomplished as expeditiously as under any other circumstances, the truck having a travel rate as permitted by the various laws and ordinances of say fifteen to thirty miles per hour.

What is claimed and it is desired to secure by United States Letters Patent is:

1. The method of supplying a concrete mixture to work comprising dumping of a coarse material into a pile depositing fines and cement on said coarse material to a heaping extent, delivering said heaping mixture to the region of the work, delivering water to said mixture, effecting agitation of the mixture and water on a horizontal axis of rotation extending through the heaping mixture to decrease the gross bulk of said mixture by working the fines and cement into the voids of the coarse material as retained in said pile, and thereafter as a separate controllable step from said agitation discharging said agitated mixture.

2. The method of supplying a mixture to work comprising providing water at a level and of less than the required quantity for the mixture, dumping the coarse material into said water to protrude above the water, dumping fines on said coarse material, isolating water reacting material from said water by depositing on said fines, transporting the mixture to the region of the work, bringing the water content up to the required quantity, and as separate steps agitating, dumping, and washing out to leave a residue of water for repeating the cycle of operations.

3. The method of supplying a mixture to work comprising providing water to a level, dumping coarse material into said water to protrude above the water, dumping fines and water reacting material on said coarse material above the water, transporting the mixture to the region of the work, agitating said mixture on a horizontal axis of rotation as extending through said material, as a step following said agitation discharging said mixture, and washing out to leave a quantity of water for a repetition of the cycle of operations.

4. The method of supplying a concrete mixture to work comprising dumping of a coarse material into a pile, depositing fines on said coarse material, delivering said material and fines to the region of the work, delivering water thereto, effecting agitation thereof on a horizontal axis of rotation extending therethrough to decrease its gross bulk by working the fines into the voids of the coarse material said agitation being independent of whether or not the material be in transit, and thereafter as a separate controllable step from said agitation, discharging said agitated mixture.

5. A transit concrete mixer comprising an auto truck, including the several wheels, the power plant, and driver's seat, a rotative mixing shell mounted on said truck, drive means operatively connecting said shell with the truck's power plant, a water tank carried by said truck and communicating with the interior of said shell, and means located adjacent the driver's seat for admitting water from said tank to the interior of said shell.

6. A transit concrete mixer comprising an auto truck, including a chassis, drive and steering wheels therefor, the power plant and the driver's seat, a rotative mixing shell mounted on said truck, drive means including a clutch operatively connecting said shell with the truck's power plant, a water tank carried by said truck and a conduit connecting said water tank with the interior of said shell, said conduit including a portion disposed adjacent the driver's seat, a control valve in said portion and operable from the driver's seat, and means for controlling said clutch.

7. A transit concrete mixer comprising an auto truck, including a chassis, drive and steering wheels therefor, the power plant, and the driver's seat, a mixing element mounted on said truck, drive means including a clutch operatively connecting said mixing element with the truck's power plant, and means located adjacent the driver's seat for controlling said clutch, whereby operation of the mixing element may be controlled.

8. A transit concrete mixer comprising an auto truck, a cylindrical shell mounted thereon to rotate upon a horizontal axis and having an opening in a cylindrical wall for charging said shell, means for driving said shell from the truck's power plant, said shell having a discharge opening at an end, and relatively shiftable means securable to and rotatable with the shell for closing said charging opening and said discharge opening.

9. The method of supplying a concrete mixture to work comprising dumping of a coarse material into a pile, depositing fines on said coarse material, traveling for a distance with the material and fines, delivering water thereto; after some of said traveling, effecting agitation of the material, fines and water on a horizontal axis of rotation to decrease the bulk thereof by working the fines into the voids of the coarse material, said agitation being independent of whether or not the material be in transit and thereafter as a separate controllable step from said agitation, discharging said agitated mixture.

10. A transit concrete mixer comprising a vehicle providing a chassis, forward and rearward pairs of wheels supporting said chassis, a closable and agitating transporting shell operatively mounted longitudinally upon said vehicle and having a lateral charging opening and a rearward discharging opening, means for closing said shell openings during agitative and transporting periods, and control means effective whether or not the mixer be in transit for imparting agitative movement to said shell, the interior walls of said shell embodying means for accelerating the agitative effect upon the concrete material adjacent the interior wall in a common direction toward the discharge opening in one direction of shell rotation.

11. A transit concrete mixer comprising an auto truck, a shell rotatively mounted thereon for transporting and mixing concrete material, said shell having a discharging opening, shell closing means at said opening, a water tank carried upon said truck and communicating with the interior of said shell independently of through said closing means, means for rotating said shell relatively to said tank, said shell having means effective upon said shell rotation to promote discharge at said opening, and control means for the rotating means independently of whether or not the mixer be in transit.

12. A transit concrete mixer comprising an auto truck provided with a driver's seat, a shell rotatably mounted on the truck for transporting and mixing concrete material, said shell having a discharging opening, shell closing means at said opening, water supply means for communicating with the shell interior independently of through said closing means, driving means for rotating said shell relatively to said water supply means, said shell having means effective upon said shell rotation to urge material axially toward the closing means at closed position, and controlling means for the driving means for rotating the shell whether or not the mixer be in transit, said water supply means being carried by said truck and controllable from the driver's seat, there being a connection between the shell and tank permitting relative movement therebetween.

13. A transit concrete mixer comprising a vehicle chassis, a pair of forward driving wheels and a pair of rear propulsion wheels mounting the chassis, a concrete mixer disposed centrally above the rear pair of wheels, a motor for the vehicle and mixer disposed above the forward pair of wheels and spaced from the mixer, a cab having therein control mechanism for the vehicle and mixer for operating the mixer independently of propelling the vehicle, said cab abutting the motor and mixer, a water tank mounted rearwardly of the cab and over the mixer, and a controllable discharge operable from the cab for the tank into the mixer.

14. A transit concrete mixer comprising a vehicle chassis, a pair of forward driving wheels and a pair of rear propulsion wheels mounting said chassis, a cylindrical concrete mixer disposed centrally above the rear pair of wheels, a motor for the vehicle and mixer disposed above the forward pair of wheels and spaced from the mixer, a cab having therein control mechanism for the vehicle and for rotating the mixer independently of propelling the vehicle, a water tank mounted rearwardly of the cab and over the mixer, a discharge for the tank axially into the mixer, and control means for said discharge operable from the cab.

15. A transit concrete mixer comprising a rotatable shell, bearing means providing a fixed horizontal axis for the shell, said shell being provided with a lateral charging opening having clearance radially through said shell for receiving material to be charged into the shell in a volume extending along longitudinally into the axial region of the shell, a vehicle for carrying the shell, a motor mounted by the vehicle, a transmission from the motor, a driving shaft from the transmission for propelling the vehicle, a control for propelling the vehicle through said shaft, and controllable actuating means extending rearwardly from the motor for rotating said shell, said shell having a terminal discharge opening and said shell being closable whereby mixing of the concrete may occur in the shell away from general change in atmosphere, said shell being openable in order that material may be discharged from the shell, said shell having means promoting said discharge during said shell rotation.

16. The method of handling concrete mixture comprising separating portions of ingredients for a concrete mixture, assembling said ingredients in a batch by piling the material of the batch upon itself, closing off the batch from general change in atmosphere, transporting the batch, rotating the batch on an axis above which the batch extends, said axis being transverse the direction of said piling of the material into the batch and progressing the material of the batch axially of its said rotation in effecting mixing thereof, exposing the material to atmosphere, further rotating and progressing the exposed material and discharging the material during said rotation by lifting successive portions of the batch for gravity action following therefrom in moving downwardly and forwardly, and controlling said rotations independently of whether or not during transporting.

17. The method of handling concrete mixture in a succession of batches comprising separating portions of ingredients for a concrete mixture, assembling said ingredients to form a batch, closing off the batch from general change in atmosphere, transporting the batch, rotating the batch, whether or not during transporting, and progressing the material of the batch axially of its said rotation in effecting mixing thereof, intercepting the material against continuous progress axially to direct said material back on itself, discharging the material by discontinuing interception, further rotating and progressing the material during said discharge, and before repetition of said handling for a succeeding batch, supplying water to the container for said batch to be effective by such rotation for washing action whether or not during transportation, retaining said wash water in the container to be incorporated in a succeeding batch.

18. A transit concrete mixer comprising a tubular shell having a terminal discharge opening, there being means including a lateral opening for charging concrete material into the shell in volume to extend above the axis of the shell and longitudinally thereof into an otherwise clear region about the axis of the shell, said shell in rotation having means effective for progressing the concrete material in the shell in a common direction toward the discharge opening of the shell in one direction of shell rotation, a closure for the charging opening, a closure for the discharging opening in closed position for intercepting said material, there being means mounting the latter closure for shifting relatively to the shell to open position for the discharging opening, and a drive for rotating the shell in transit or out of transit to effect through said progressing means flow of concrete material from the shell to and through the discharging opening.

19. A transit concrete mixer comprising a vehicle having a chassis, a concrete mixing shell on said chassis, said shell having a terminal discharge opening, there being means including a lateral opening effecting charging of the shell above the axis of the shell longitudinally along the axis of the shell, a closure for the charging opening, an additional closure for the discharging opening, said closures cooperating for closed shell mixing operation, there being releasing means from closed position of said charging closure whereby said charging closure may then be shifted relatively to the shell to open position for the opening, and a drive for rotating the shell on an axis longitudinally of the vehicle, said shell having means to effect flow of the material from the shell at the discharging opening during said rotation.

20. A transit concrete mixer comprising a vehicle, horizontally disposed bearings extending rearwardly of the vehicle and carried thereby, a shell carried by the vehicle including mixing means mounted in said bearings, said shell having a lateral charging opening, a discharging opening, said discharging opening being rearwardly of the vehicle, a motor mounted by the vehicle, a transmission rearwardly from the motor, a driver's seat on the vehicle, said shell being closable to retain a charge of the material in volume extending along longitudinally in the axial region of the shell, and a control from the driver's seat for connecting the transmission for effecting rotation of the mixing means in said bearings, said shell being openable and said shell having means in order that there may be effected discharge of mixed concrete from the shell to said discharge opening promoted by said rotation.

21. A transit concrete mixer comprising a concrete mixing closed rotary shell having axially thereof a terminal discharge opening, and a lateral charging opening through which lateral opening there may be effected charging of the shell in a volume to extend above the axis of the shell longitudinally thereof into an otherwise clear region about the axis of the shell, a closure for the charging opening, an additional closure for the discharging opening cooperating with the shell when in closed position at the discharging opening to retain the charged material even with the shell at rest, said discharging opening closure being shiftable as to the shell for maintaining open position for the opening for material discharge, and a drive for rotating the shell, said shell having means thereby to effect flow of the material in the shell toward said discharge end and from the shell at the discharging opening.

22. A transit concrete mixer comprising a vehicle providing a chassis, forward and rearward pairs of wheels supporting said chassis, a closable and agitating transporting shell operatively mounted upon said vehicle and provided with a lateral charging opening having clearance radially through said shell, and spaced therefrom and independent of said lateral opening an axial discharging opening, means for closing said shell openings during agitative and transporting periods, and control means effective whether or not the mixer be in transit for imparting agitative movement to said shell, the interior walls of said shell embodying means for accelerating the agitative effect upon the concrete material adjacent the interior wall in a common direction toward the discharge opening in one direction of shell rotation.

In witness whereof I affix my signature.

HARRY J. SHAW.